(No Model.)
E. BERLINER.
SPONGY CARBON BATTERY.
No. 347,023. Patented Aug. 10, 1886.
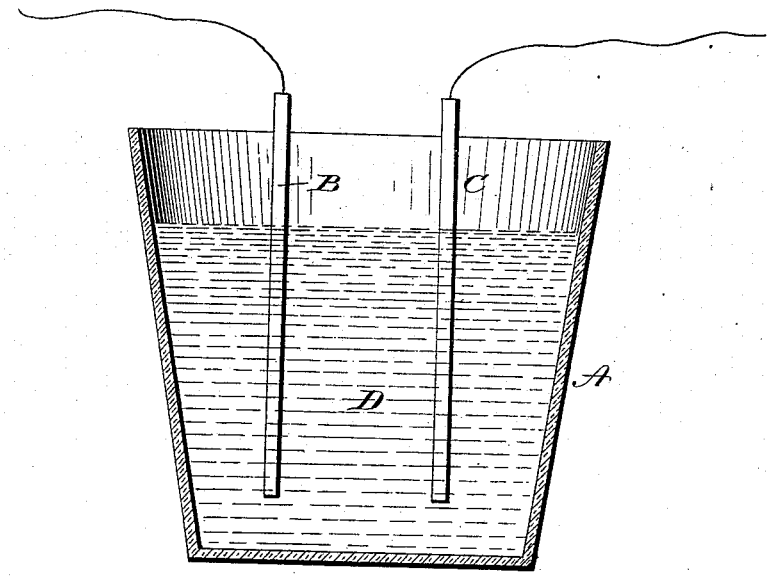

UNITED STATES PATENT OFFICE.

EMILE BERLINER, OF WASHINGTON, DISTRICT OF COLUMBIA.

SPONGY-CARBON BATTERY.

SPECIFICATION forming part of Letters Patent No. 347,023, dated August 10, 1886.

Application filed February 25, 1886. Serial No. 193,190. (Specimens.)

*To all whom it may concern:*

Be it known that I, EMILE BERLINER, a citizen of the United States of America, residing at Washington, in the District of Columbia, have invented certain new and useful Improvements in Spongy-Carbon Batteries, of which the following is a specification, reference being had therein to the accompanying drawing.

This invention refers to all batteries in which carbon is used as an electrode, and in particular to secondary elements or accumulators.

Ordinary carbon such as is used in batteries is not as porous as is generally supposed, and the electrolytic action occurs almost entirely on its surface or just below the surface. Liquids poured on ordinary carbon are not sucked in very quickly, which also proves that its porosity is very limited. I find, however, that if ordinary carbon is partially burned by subjecting it to red heat with free access of the air it becomes extremely porous, and it will then suck up liquids with an avidity equal if not superior to common porous earthenware—almost like a sponge. It appears to me as certain that the porosity is produced by the heat driving off first the lighter hydrocarbons of the carbon piece heated, while the harder particles remain as a highly capillary mass. It is evident, then, that such spongy carbon is vastly superior as an electrode to the ordinary carbon, because it presents an enormously large surface to the electrolytic action which is not limited to the surface, but pervades the whole inside, decreases the resistance, and improves the depolarizing action. Two such spongy carbons immersed in acidulated water form a very efficient secondary element, because a large amount of hydrogen and oxygen gas can be occluded in their pores; but it is in secondary elements, employing the salts or oxides of lead that spongy carbon finds an important application. For this purpose I soak two spongy carbons in a cold saturated solution of lead salts—such as the nitrate or the acetate. I then dry the two electrodes thus charged with lead salt and, immersing them in acidulated water, decompose the salts of lead by primary electric charges and transform the salts in peroxide and sulphate of lead; or I immerse two dry spongy-carbon electrodes in a solution of acetate or nitrate of lead, or a mixture of both, in combination with sulphuric acid, and then join them into a primary charging circuit, thereby depositing sulphate and peroxide in the two carbon electrodes, respectively.

In the drawing, A is a vessel containing an electrolytic solution, D, into which are immersed the two spongy-carbon electrodes B and C. These spongy carbons are produced by heating to redness, and with free access of the air ordinary battery-carbon by this process is partially consumed, and thereby becomes extremely porous. The electrolytic solution D consists either of acid solution or of saturated or diluted salty fluids. This depends upon the nature of the results to be attained. For primary batteries, for instance, it is sulphuric acid and water, and one of the spongy carbons is then substituted by a piece of zinc. For secondary couples the fluid is preferably a solution containing salts of lead. In both cases the galvanic action is improved by the extreme porosity of the spongy carbon, as described above.

What I claim is—

In a process of producing battery-carbons, the mode of making ordinary battery-carbon porous and highly capillary by submitting it to a high heat with free access of the air, thus partially consuming the said carbon.

In testimony whereof I have affixed my signature in presence of two witnesses.

EMILE BERLINER.

Witnesses:
S. WOLF,
D. CARROLL DIGGES.